United States Patent Office 3,208,861
Patented Sept. 28, 1965

3,208,861
PREVENTION OF HYDRATION
George R. Henry, Bethel Park, and Donald F. King and Ben Davies, Pittsburgh, Pa., assignors to Harbison-Walker Refractories Company, Pittsburgh, Pa., a corporation of Pennsylvania
No Drawing. Filed Apr. 5, 1963, Ser. No. 270,793
8 Claims. (Cl. 106—57)

This invention relates to promoting hydration resistance for size graded refractory specialty mixtures, which include a high proportion of high purity magnesia in the fine or —65 mesh fraction. In a particular embodiment, the invention relates to an improved bonding complex for unfired basic refractory specialties, which include a high percentage of high purity magnesia in the fines.

Magnesia is notoriously susceptible to hydration upon exposure to the atmosphere. It also has a tendency to cause bloating and swelling when used with an aqueous tempering media. This tendency to hydrate is particularly distressing to the refractories industry, which uses large quantities of magnesia in the manufacture of basic refractory specialties. It is even more pronounced with the high purity dead burned synthetic magnesia which is used today. By high purity, we mean containing at least about 90% MgO, by weight and on the basis of an oxide analysis, and preferably above about 95%. By synthetic, we mean recovered from brines, bitterns, sea water or the like.

Accordingly, it is an object of this invention to provide an improved hydration preventing bonding system, for size graded refractories specialties which include a high percentage of finely divided high purity magnesia.

Briefly, according to one aspect of the invention, a bonding system is provided for a size grade refractory batch. The bonding system is comprised of about 1 to 5% of volatilized silica, about .1 to 1% sodium pyrophosphate having the formula $Na_4P_2O_7$, and about 1 to 5% sodium silicate having an $Na_2O$ to $SiO_2$ weight ratio on the order of about 1 to 3.2 and analyzing about 23.2 $Na_2O$ and about 75.7 parts $SiO_2$. The volatilized silica is all less than 44 microns. The sodium pyrophosphate is technical grade and substantially all —100 mesh. The sodium silicate is essentially —65 mesh.

From 10 to 40% of the size graded refractory batch is —65 mesh dead burned magnesia of at least about 95% MgO content, and in which more than 50% of the —65 mesh magnesia passes a 325 mesh screen. The coarse +65 mesh fraction of the size graded batch may be comprised of almost any compatible refractory aggregate. Examples are calcined Alabama bauxite, calcined diaspore, kyanite, zircon, silicon carbide, Transvaal and Philippine chrome ore, olivine, refractory aluminas, etc.

The following examples, which are given by way of explanation and not by way of limitation, more particularly point out the best modes now known to us for the practice of this invention. All parts and percentages are by weight, unless otherwise specifically stated. All chemical analyses are on the basis of an oxide analysis, in conformity with the conventional practices of reporting the chemical content of refractory materials. All analyses should be considered but typical. All size grading is according to the standard Tyler series.

Example I

A refractory batch mixture was prepared, which consisted essentially of a dead burned magnesite of about 94.8% MgO. The remainder of this magnesite was about 2.8% $SiO_2$, about 0.3% $Al_2O_3$, about 0.6% $Fe_2O_3$ and about 1.5% CaO. The batch sizing was substantially as follows: 40% 3½ on 8 mesh, about 27% —8 +28 mesh, the remainder passing 28 mesh. Of that portion passing a 28 mesh screen, about 95% passed a 65 mesh screen. Of that portion passing the 65 mesh screen, 60% passed a 325 mesh screen. This —65 mesh fraction can be termed "super ball mill fines." To this batch we added 0.5% of volatilized silica, 1% of sodium silicate having an $Na_2O$ content of about 23.5% and an $SiO_2$ content of 75.7% (all —65 mesh), and about .25% $Na_4P_2O_7$ (sodium pyrophosphate). We tempered this batch with about 6%, by weight, of water, based on the total dry solids in the batch. The batch had good flow and was easily cast. Shapes made from this batch were placed in an autoclave, and subjected to steam at a pressure of 80 p.s.i. for about one hour. The shapes were apparently unaffected. This established hydration resistance for the shapes.

An identical batch was prepared, in which no volatilized silica was included; and in the steam autoclave at 80 p.s.i., the shape disintegrated. Another batch was prepared, in which the —65 mesh fraction of the batch had less than 10% thereof passing a 325 mesh screen. In essence, this fraction would be termed "regular ball mill fines" in the industry. We added about 8% of water as a tempering agent. These shapes had satisfactory resistance to hydration in the steam test. The shapes were not as strong as the batch containing super ball mill fines. They were, otherwise, satisfactory.

In still another test, we added about 1.5% volatilized silica, 1% of highly alkaline sodium silicate analyzing about 27.5% $Na_2O$ and about 55% $SiO_2$, and 0.25% sodium pyrophosphate as the bonding complex. The magnesia sizing was about the same as Example I, above. We used about 8% of water as a tempering agent. This batch gelled in the mixer.

In general, our work established that, for superior hydration resistance and good strength in the product, the bonding complex must consist of the comibnation (1) ball mill fines magnesia, (2) volatilized silica, (3) a less alkaline sodium silicate, and (4) sodium pyrophosphate. Lacking any one of the foregoing, satisfactory results were not obtained.

Example II

A good batch can consist entirely of a dead burned magnesite analyzing 98% MgO, about 0.6% $SiO_2$, about 0.3% $Al_2O_3$, about 0.3% $Fe_2O_3$, about 0.6% CaO; the remainder being loss on ignition. The sizing of the batch is identical to Example I, above. A bonding complex of about 1% of volatilized silica and about 1.5% of sodium silicate having a soda:silica ratio of about 1 to 3.2, and about 0.2% of sodium pyrophosphate is added to the batch. 7% water is used as the tempering agent.

Generally, no more than about 8%, by weight, of water can be added to the specialty refractories of this invention, with about 6 to 7% being considered optimum. Optimum results are obtained when the volatilized silica addition is about 2%, when the sodium pyrophosphate (or a chemically equivalent alkaline phosphate) addition is between 0.1 and 1%, and when the sodium silicate is about 2%, all parts by weight. We do not wish highly alkaline sodium silicates, since these appear to chemically react with the volatilized silica and prevent its acting as the bonding agent we desire. As a practical matter, the $Na_2O$ to $SiO_2$ ratio should be kept under about 1 to 3. Also, more alkaline silicates tend to age in storage, losing their reactivity.

From 10 to 40% of the batch of this invention is dead burned magnesia. This magnesia is all —65 mesh, and at least 50% should be —325 mesh ("super ball mill fine magnesia"). When we say "at least 50%" we intend to include 100% of the magnesia passing a 65 mesh screen also passing a 325 mesh screen. However, we caution that as —325 mesh magnesia approaches 40% of the total batch weight, the batch tends to set up very rapidly.

Having thus described the invention in detail and with sufficient particularity as to enable those skilled in the art to practice it, what is desired to have protected by Letters Patent is set forth in the following claims.

We claim:

1. In unconsolidated unfired refractory specialties consisting of a size graded batch mixture of dry refractory particles having a coarse fraction held on 65 mesh and a fine fraction passing 65 mesh, said coarse fraction selected from the group consisting of calcined bauxite, calcined diaspore, kyanite, zirconia, silicon carbide, Transvaal and Philippine chrome ore, olivine, refractory aluminas and dead burned magnesite, said fine fraction being from 10 to 40%, by weight, based on the total batch weight, of the dead burned magnesite and it being of at least about 90% MgO content, the improvement which consists of the following to promote resistance to hydration and increased strength:
    (A) said batch including,
        (a) from 1 to 5% of a —65 mesh sodium silicate which is no more alkaline than one having one mole of $Na_2O$ and three moles of $SiO_2$,
        (b) from 1 to 5% of volatilized silica,
        (c) from 0.1 to 1% of sodium pyrophosphate,
    (B) the magnesite being super ball mill fines.

2. The batch of claim 1 in which said batch including:
    (a) about 2% of sodium silicate,
    (b) about 2% of volatilized silica,
    (c) about 0.1 to 1% of the sodium pyrophosphate.

3. The batch mixture of claim 1 in which the refractory particles are substantially all dead burned magnesite of at least about 95% MgO content.

4. The batch of claim 1 in which from 50 to 60% of the dead burned magnesite is —325 mesh in size.

5. The batch of claim 3 in which a substantial portion of the refractory particles rest on an 8 mesh screen.

6. In size graded refractory batches for making refractory shapes having a coarse fraction held on 65 mesh and a fine fraction passing 65 mesh, said coarse fraction selected from the group consisting of calcined bauxite, calcined diaspore, kyanite, zirconia, silicon carbide, Transvaal and Philippine chrome ore, olivine, refractory aluminas and dead burned magnesite, said fine fraction being from 10 to 40%, by weight, based on the total batch weight, of the dead burned magnesite, the improvement which consists of the following to promote resistance to hydration and increased strength:
    (A) said batch including,
        (a) from 1 to 5% of a —65 mesh sodium silicate which is no more alkaline than one having one mole of $Na_2O$ and three moles of $SiO_2$,
        (b) from 1 to 5% of volatilized silica,
        (c) from 0.1 to 1% of sodium pyrophosphate,
    (B) the magnesite being ball mill fines.

7. In methods of preparing size graded refractory batches for making refractory shapes having a coarse fraction held on 65 mesh and a fine fraction passing 65 mesh, said coarse fraction selected from the group consisting of calcined bauxite, calcined diaspore, kyanite, zirconia, silicon carbide, Transvaal and Philippine chrome ore, olivine, refractory aluminas and dead burned magnesite, said fine fraction including from 10 to 40% by weight, based on the total batch weight, of the dead burned magnesite, the improvement which consists of the steps of:
    (A) adding to the batch
        (a) from 1 to 5% of a —65 mesh sodium silicate which is not more alkaline than one having one mole of $Na_2O$ and three moles of $SiO_2$,
        (b) from 1 to 5% of volatilized silica,
        (c) from 0.1 to 1% of sodium pyrophosphate,
    (B) reducing the magnesite to super ball mill fines, and
    (C) tempering the batch with no more than about 8 parts, by weight, of water, based on the total dry solids in the batch.

8. In a size graded refractory batch mixture having a coarse fraction held on 65 mesh and a fine fraction passing 65 mesh, said coarse fraction of dry refractory particles, said particles being selected from the group which consists of calcined bauxite, calcined diaspore, kyanite, zirconia, silicon carbide, Transvaal and Philippine chrome ore, olivine, refractory aluminas, and dead burned magnesite and in which said fine fraction is from 10 to 40%, by weight, based on the total weight of the batch of the dead burned magnesite, the improvement which consists of the following to promote resistance to hydration and increased strength:
    (A) said batch including,
        (a) from 1 to 5% of a sodium silicate which is no more alkaline than one having one mole of $Na_2O$ and three moles of $SiO_2$,
        (b) from 1 to 5% of volatilized silica,
        (c) from 0.1 to 1% of sodium pyrophosphate,
    (B) said 10 to 40% of dead burned magnesite being ball mill fines.

References Cited by the Examiner

UNITED STATES PATENTS 2,947,649 8/60 Davies _____ 106—58
3,075,848 1/63 Davies et al. _____ 106—58

TOBIAS E. LEVOW, *Primary Examiner.*